Sept. 30, 1924.
E. J. RIMPLE
1,509,903
DEPTH CONTROL AND POWER LIFT DEVICE FOR PLOWS
Filed Dec. 4, 1922
2 Sheets-Sheet 1
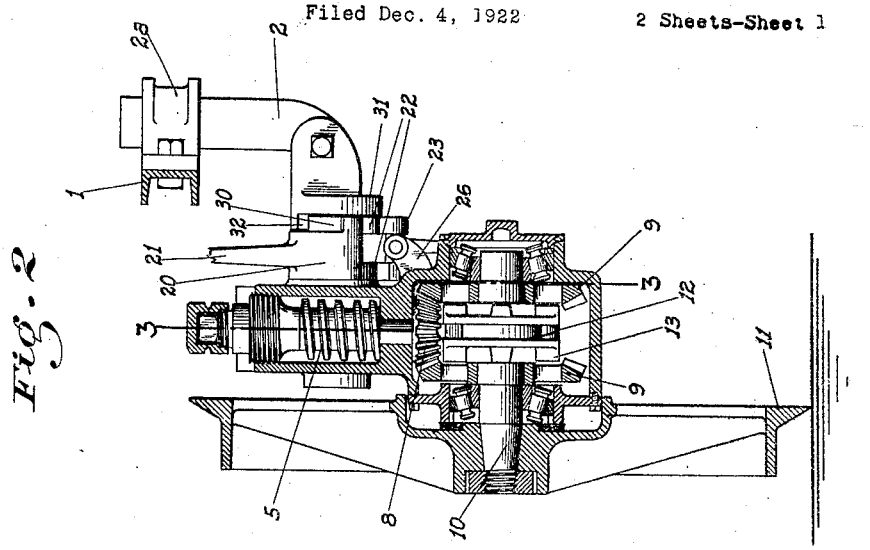
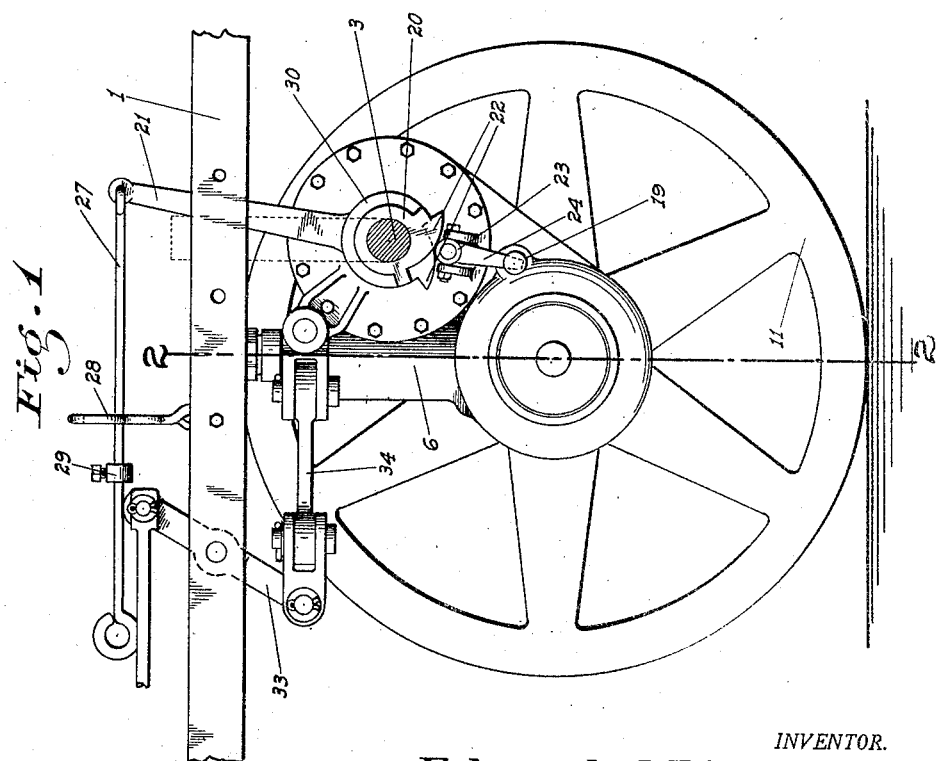
INVENTOR.
Edward J. Rimple
BY
ATTORNEY Sept. 30, 1924.

E. J. RIMPLE 1,509,903

DEPTH CONTROL AND POWER LIFT DEVICE FOR PLOWS

Filed Dec. 4, 1922     2 Sheets-Sheet 2

INVENTOR.
Edward J. Rimple
BY
ATTORNEY

Patented Sept. 30, 1924.

1,509,903

UNITED STATES PATENT OFFICE.

EDWARD J. RIMPLE, OF SAN JOSE, CALIFORNIA.

DEPTH-CONTROL AND POWER-LIFT DEVICE FOR PLOWS.

Application filed December 4, 1922. Serial No. 604,749.

*To all whom it may concern:*

Be it known that I, EDWARD J. RIMPLE, a citizen of the United States, residing at San Jose, county of Santa Clara, State of California, have invented certain new and useful Improvements in Depth-Control and Power-Lift Devices for Plows; and I do declare the following to be a full, clear, and exact description of the same, reference being had to the accompanying drawings and to the characters of reference marked thereon, which form a part of this application.

This invention relates to improvements in power-actuated devices for lifting or lowering the frame of a plow or other agricultural implement, and consequently controlling the depth at which the plows, cultivators, or other devices will operate.

The present invention is particularly an improvement over that type of power-lift device shown in Patent No. 1,398,494, the principal object being to devise a mechanism for the purpose which, except for the controlling lever, will be a compact unit supported by and between a wheel and its spindle.

A further object is to provide a means whereby besides the operation of the mechanism being halted when a predetermined vertical movement of the frame has taken place, said mechanism will be automatically thrown out of operation when the limit of movement of the frame either up or down has been reached, thereby avoiding possible breakage of the parts should the operator himself fail to cause a stopping of such movement.

These objects I accomplish by means of such structure and relative arrangement of parts as will fully appear by a perusal of the following specification and claims.

In the drawings similar characters of reference indicate corresponding parts in the several views.

Fig. 1 is a side view of the device, looking outwardly from the inner face of the frame and wheel.

Fig. 2 is a vertical section on the line 2—2 of Fig. 1.

Figure 3:
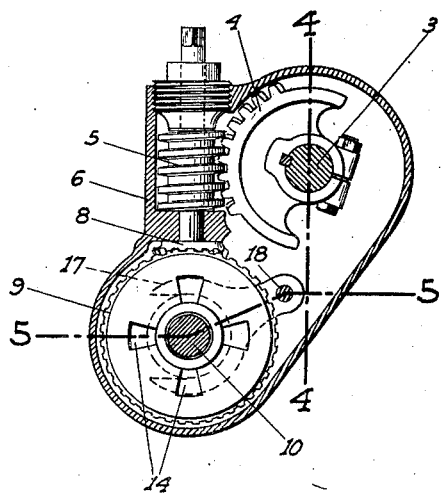
Fig. 3 is a longitudinal section on the line 3—3 of Fig. 2, the wheel being omitted.
Figure 4:
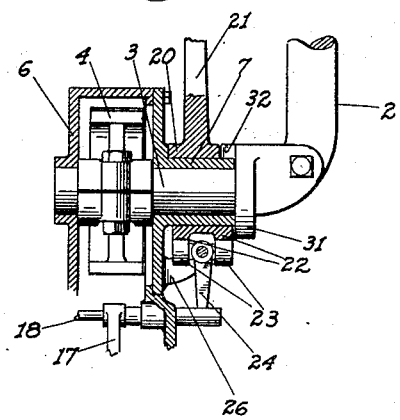
Fig. 4 is a fragmentary section on the line 4—4 of Fig. 3.
Figure 5:
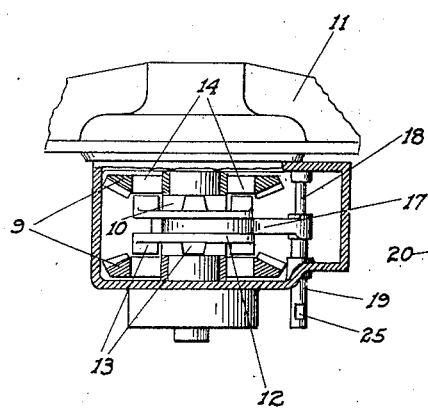
Fig. 5 is a fragmentary section on the line 5—5 of Fig. 3.
Figures 6, 7:
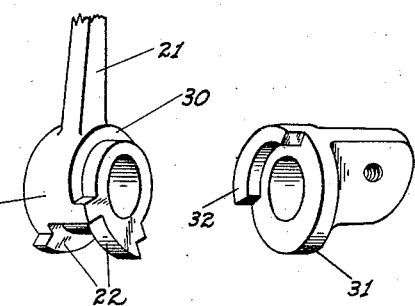
Fig. 6 is a fragmentary perspective view of the control lever, detached.
Fig. 7 is a similar view of a co-operating movement limiting member.
Figure 8:
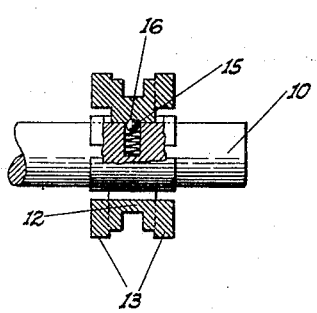
Fig. 8 is a fragmentary section of the sliding clutch and its shaft, showing a stop means to hold said clutch in neutral position.

Referring now more particularly to the characters of reference on the drawings, the numeral 1 denotes the plow frame having at a predetermined point, a vertical spindle-post 2 rigidly fixed on the frame by suitable means, and having a horizontal spindle 3. Fixed on said spindle is a segmental gear 4 meshing with a substantially vertically disposed worm 5 journaled in a housing 6 which has sleeve portion 7 turnably mounted on the spindle 3 between the gear 4 and post 2. Fixed in connection with the worm 5 at the lower end thereof is a bevel pinion 8, meshed with oppositely disposed bevel gears 9 turnably mounted on an axle 10 turnably mounted in the housing 6. This axle is parallel to the spindle 3 in a plane ahead of the same, and projects from the housing at that side thereof opposite to the post 2, having fixed on that end a wheel 11 which rests on the ground and supports the plow frame.

By reason of the above described construction and arrangement of parts, if the worm is turned, the housing 6, with the parts mounted in connection therewith, will be caused to turn about the fixed spindle as an axis, causing the wheel to be raised or lowered relative to the frame, and thus altering the level of the latter relative to the ground.

This turning of the worm at will is actuated by the turning of the wheel 11 itself by the following means.

Splined on the axle 10 between the gears 9 is a double-faced clutch member 12, having jaws 13 on its opposite faces adapted to alternately project into correspondingly shaped orifices 14 in the gears. This clutch member is held from too easy movement when in neutral position intermediate said gears by reason of a spring-pressed ball 15 or similar member mounted in the shaft and extending into a recess 16 in the clutch member when the latter has been moved to said neutral position.

A clutch yoke 17 engages the clutch member, and is slidably mounted transversely in the housing 6 on a shaft 18, a sleeve 19 on said shaft and connected to the yoke passing out through one side of the housing.

Turnably mounted on the housing-sleeve 7 is the hub 20 of a hand lever 21, said hub having on its under side a pair of opposed cams 22 adapted to engage a pair of rollers 23 which are mounted in common with an arm 24 the lower end of which projects into a slot 25 in the outer end of the sleeve 19.

The arm 24 is pivoted to and between lugs 26 projecting from the housing, the pivotal axis of said arm being in a plane at right angles both to the axis of the rollers 23 (which lie in a plane parallel to the sleeve 19) and to said sleeve itself. It will therefore be seen that as the lever 21 is moved about the hub 7 as an axis, one cam or the other will engage and depress the corresponding roller, causing the arm 24 to swing to one side or the other (which movement will be in a plane longitudinally of the sleeve 19) imparting a sliding movement to said sleeve, the fork 17, and clutch member 12.

The direction in which the clutch member moves, upon which is dependent the direction or rotation of the worm and that of the housing, depends of course upon whether the lever is moved in one direction or the other.

Once the lever has been thrown to cause the clutch to engage either gear 9, it will then rotate with the housing and will remain in the same position relative thereto until it is positively halted so that with the continued rotation of the housing the arm 24 will be moved in the direction opposite to that in which it was moved with the initial throwing of the lever, until the neutral position of said arm and clutch has been reached, when further rotation of the housing will of course cease.

This stopping of the lever is accomplished in three ways:—First, by hand. Second, by connecting a pull-rod 27 to the lever which passes through and rests in a guide yoke 28, and placing an adjustable stop-block 29 on the lever on either side of the yoke depending in which direction the lever is moving or is to be moved, the position of this stop being set by the operator, so that when said stop abuts against the yoke, the lever cannot move further, resulting as above shown, in the halting of the raising or lowering operation.

This means for stopping the lever is the one most frequently and normally used, since by proper adjustment of the stops the operator will be assured that the frame will always be stopped after the same amount of movement thereof has been had.

The third means of stopping the lever, which may be termed the emergency release, positively insures such stopping when the limit of movement of the housing in either direction has been reached, and independent of the stop-block.

This means comprises a peripheral and blunt-ended recess 30 cut in the lever-hub 20 on the face thereof adjacent the post 2, said recess extending only partway around the hub.

Fixed on the spindle 3 adjacent said hub-face is a disc 31 having a flange 32 overhanging its face adjacent said hub and fitting in the recess 30, said flange being of lesser extent than the recess. This difference in length is slightly less than the total possible arcurate movement of the housing about the spindle, so that as the lever and housing approach their limit of movement in either direction, one end of the recess of the moving hub abuts against the corresponding end of the fixed flange, stopping of the lever, with the result as described above.

In order to transmit the movement of the housing to other housings or wheels if such are provided with the implement, I provide a lever 33 pivoted on the frame 1, there being a rigid connecting link 34 between the lever and the housing and pivoted at a point on the latter suitably offset from the spindle 3, which is the axis of turning of the mechanism.

The lever may be connected by suitable means to other similar members so as to impart corresponding movement thereto.

It will be noted that when the mechanism is operating to raise the frame the wheel, in turning the gearing, is held to the ground while the plow is being drawn forward. This has a favorable leverage on the crank action to the wheel axle, and governs the load carried on the gearing.

This type of wheel can be designed to be used in place of any other wheel on the implement, as the portion 2 of the spindle can be turned in the main frame bracket 2ª, enabling the longitudinal angle of setting of the wheel to be altered, or so that the latter may be turned for steering purposes.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A power lift for plows and the like including a fixed horizontal spindle, a rotatable wheel whose axis lies in a plane offset from said spindle, means connecting said spindle and wheel in a manner to permit arcuate movement of the wheel axis about the spindle as an axis, means actuated by the rotation of the wheel for imparting such movement to the wheel axis in either direction, hand actuated means for putting said actuating means into action, and independently acting means for automatically throwing said actuating means out of action when the wheel axis has reached its limit of arcuate movement in either direction.

2. A power lift for plows and the like including a fixed horizontal spindle, a rotatable wheel whose axis lies in a plane offset from said spindle, means connecting said spindle and wheel in a manner to permit arcuate movement of the axis of the latter about the spindle as an axis, means actuated by the rotation of the wheel for imparting such movement to the wheel axis, hand actuated means for putting said actuating means into action, and independent means for causing said actuating means to be thrown out of action after any predetermined arcuate movement of the wheel axis has taken place.

3. A power lift for plows and the like including a fixed horizontal spindle, a rotatable wheel whose axis lies in a plane offset from said spindle, means connecting said spindle and wheel in a manner to permit arcuate movement of the axis of the latter about the spindle as an axis, means actuated by the rotation of the wheel for imparting such movement to the wheel axis, hand actuated means for putting said actuating means into action, adjustable means for causing said actuating means to be automatically thrown out of action after any predetermined extent of arcuate movement of the wheel axis has been had, and means acting independently of said last named means for similarly throwing said actuating means out of action when the wheel axis has reached its limit of arcuate movement in either direction.

4. A power lift for plows and the like including a fixed horizontal spindle, a housing member turnably mounted thereon, an axle turnably mounted in the housing in a plane offset from the spindle, a wheel fixed on the axle, a gear fixed on the spindle, a worm wheel mounted in the housing and meshing with the gear, and means between the axle and worm wheel and controllable at will whereby the worm wheel may be caused to turn in either direction with the rotation of the axle in one direction.

5. A power lift for plows and the like including a fixed horizontal spindle, a housing member turnably mounted thereon, an axle turnably mounted in the housing in a plane offset from the spindle, a wheel fixed on the axle, a gear fixed on the spindle, a worm wheel mounted in the housing and meshing with the gear, a bevel gear fixed with the worm, co-operating and oppositely disposed bevel gears on the axle, and means for placing either bevel gear at a time into driving relation with the axle and worm.

6. A power lift for plows and the like including a fixed horizontal spindle, a housing member turnably mounted thereon, an axle turnably mounted in the housing in a plane offset from the spindle, a wheel fixed on the axle, a gear fixed on the spindle, a worm wheel mounted in the housing and meshing with the gear, a bevel gear fixed with the worm, co-operating and oppositely disposed bevel gears turnably mounted on the axle and both meshing with the worm, and catch means slidably splined on the axle between said gears and engageable at will with either of such gears.

7. A power lift for plows and the like including a fixed horizontal spindle, a housing member turnably mounted thereon, an axle turnably mounted in the housing in a plane offset from the spindle, a wheel fixed on the axle, a gear fixed on the spindle, a worm wheel mounted in the housing and meshing with the gear, a bevel gear fixed with the worm, co-operating and oppositely disposed bevel gears, turnably mounted on the axle, and both meshing with the worm, clutch means splined on the axle between said gears and adapted to engage either at a time of such gears, a hand lever mounted in connection with the housing, and means between said lever and catch means for actuating the latter.

8. A power lift for plows and the like including a fixed horizontal spindle, a housing member turnably mounted thereon, an axle turnably mounted in the housing in a plane offset from the spindle, a wheel fixed on the axle, a gear fixed on the spindle, a worm wheel mounted in the housing and meshing with the gear, a bevel gear fixed with the worm, co-operating and oppositely disposed bevel gears turnably mounted on the axle, and both meshing with the worm, clutch means splined on the axle between said gears and adapted to engage either at a time of such gears, a hand lever mounted in connection with the housing and connected to the clutch means to actuate the same, said lever turning with the housing when the latter turns, means whereby after a predetermined turning movement of said housing the lever will be automatically held against movement, and means whereby with a further turning of the housing the clutch means will be disengaged.

9. A power lift for plows and the like including a fixed horizontal spindle, a housing member turnably mounted thereon, an axle turnably mounted in the housing in a plane offset from the spindle, a wheel fixed on the axle, a gear fixed on the spindle, a worm wheel mounted in the housing and meshing with the gears, a bevel gear fixed with the worm, co-operating and oppositely disposed bevel gears on the axle, clutch means for placing either bevel gear at a time into driving relation with the axle and worm, a hand lever turnably mounted about the spindle as an axis, a clutch operating yoke slidable in a plane at right angles to the plane of movement of the lever, and means between said lever and yoke for sliding the latter in either direction with a turning movement of the lever about the spindle in a corresponding direction.

10. A power lift for plows and the like including a fixed horizontal spindle, a housing member turnably mounted thereon, an axle turnably mounted in the housing in a plane offset from the spindle, a wheel fixed on the axle, a gear fixed on the spindle, a worm wheel mounted in the housing and meshing with the gear, a bevel gear fixed with the worm, co-operating and oppositely disposed bevel gears on the axle, clutch means for placing either bevel gear at a time into driving relation with the axle and worm, a sleeve on the housing surrounding the spindle, a hand lever having a hub mounted on said sleeve, a clutch operating yoke slidable in a plane at right angles to the plane of movement of the lever, an arm pivoted under said lever hub and operatively connected to the yoke to shift the same with a swinging movement of said arm, and means between the lever hub and arm for so moving the latter with a movement of the lever.

11. A power lift for plows and the like including a fixed horizontal spindle, a housing member turnably mounted thereon, an axle turnably mounted in the housing in a plane offset from the spindle, a wheel fixed on the axle, a gear fixed on the spindle, a worm wheel mounted in the housing and meshing with the gear, a bevel gear fixed with the worm, co-operating and oppositely disposed bevel gears on the axle, clutch means for placing either bevel gear at a time into driving relation with the axle and worm, a sleeve on the housing surrounding the spindle, a hand lever having a hub mounted on said sleeve, a clutch operating yoke slidable in a plane at right angles to the plane of movement of the lever, an arm pivoted under said lever hub and operatively connected to the yoke to shift the same with a swinging movement of said arm, rollers projecting from opposite sides of the pivotal connection of the arm, and opposed cams on the lever hub arranged to depress either at a time of said rollers with a movement of the lever in a corresponding direction.

12. A power lift for plows and the like including a fixed horizontal spindle, a housing member turnably mounted thereon, an axle turnably mounted in the housing in a plane offset from the spindle, a wheel fixed on the axle, a gear fixed on the spindle, a worm wheel mounted in the housing and meshing with the gear, a bevel gear fixed with the worm, co-operating and oppositely disposed bevel gears on the axle, clutch means for placing either bevel gear at a time into driving relation with the axle and worm, a sleeve on the housing surrounding the spindle, a hand lever having a hub mounted on said sleeve, means between said lever and clutch means for actuating the latter with a turning of the lever, the latter turning with the housing and sleeve when the latter turn, an arcuate and blunt ended recess formed in the face of the lever-hub away from the housing, and a stop member fixed with respect to the housing projecting into the recess and adapted to engage either end of the recess to stop the movement of the lever with the housing after the latter has turned a predetermined distance.

In testimony whereof I affix my signature.

EDWARD J. RIMPLE.